(No Model.) 3 Sheets—Sheet 1.

H. S. ROBINSON.
APPARATUS FOR UTILIZING WASTE HEAT FROM STEAM ENGINES AND SIMILAR APPARATUS.

No. 407,838. Patented July 30, 1889.

Witnesses
Jas. J. Maloney.
H. E. Hill.

Inventor,
H. S. Robinson
By Jos. P. Livermore
Att'y.

(No Model.) 3 Sheets—Sheet 2.

H. S. ROBINSON.
APPARATUS FOR UTILIZING WASTE HEAT FROM STEAM ENGINES AND SIMILAR APPARATUS.

No. 407,838. Patented July 30, 1889.

Witnesses.
Jas. J. Maloney
M. E. Hill

Inventor,
H. S. Robinson
by Jos. P. Livermore
Att'y.

(No Model.) 3 Sheets—Sheet 3.
H. S. ROBINSON.
APPARATUS FOR UTILIZING WASTE HEAT FROM STEAM ENGINES AND SIMILAR APPARATUS.
No. 407,838. Patented July 30, 1889.
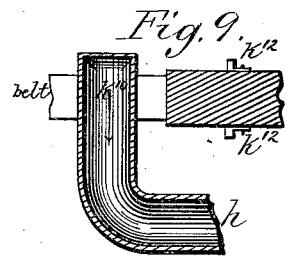
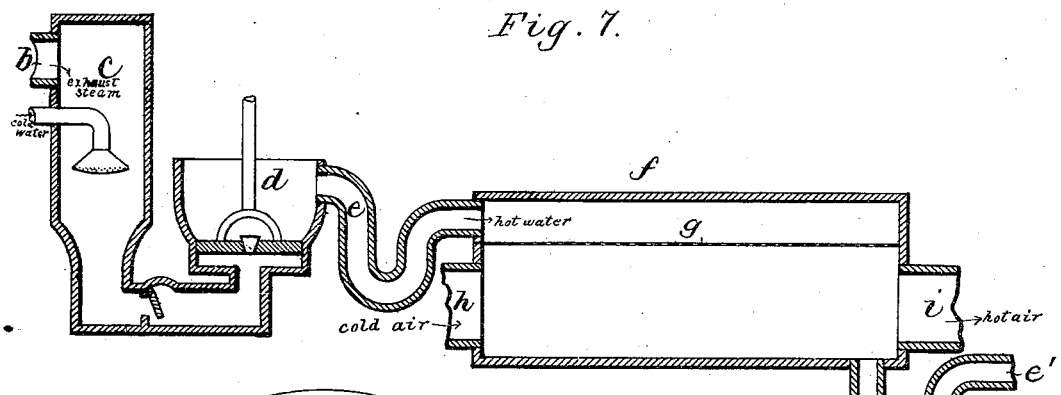
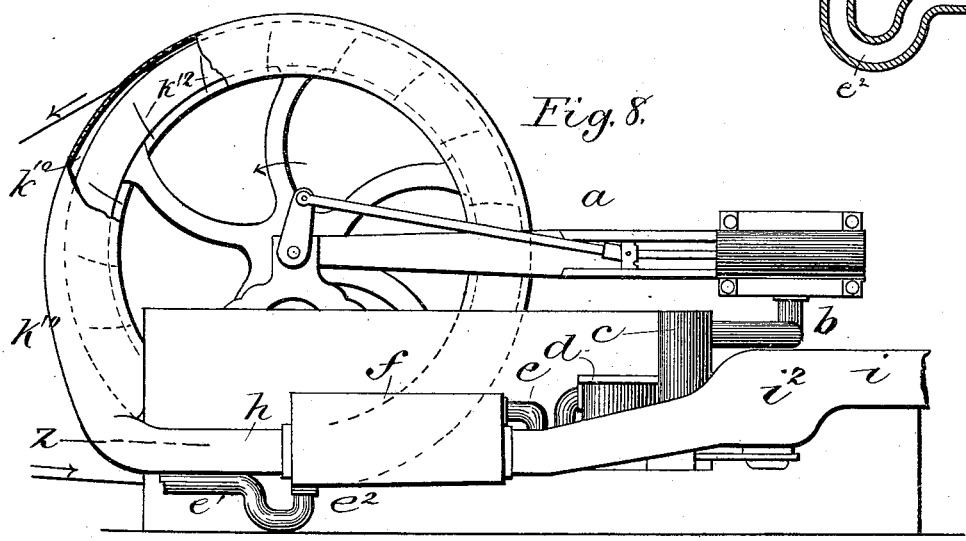
Witnesses,
Jas. J. Maloney
M. E. Hill
Inventor,
Henry S. Robinson
by Jos. P. Livermore
Att'y.

UNITED STATES PATENT OFFICE.

HENRY S. ROBINSON, OF ANDOVER, MASSACHUSETTS.

APPARATUS FOR UTILIZING WASTE HEAT FROM STEAM-ENGINES AND SIMILAR APPARATUS.

SPECIFICATION forming part of Letters Patent No. 407,838, dated July 30, 1889.

Application filed November 10, 1887. Serial No. 254,760. (No model.)

*To all whom it may concern:*

Be it known that I, HENRY S. ROBINSON, of Andover, county of Essex, State of Massachusetts, have invented an Improvement in Apparatus for Utilizing Waste Heat from Steam-Engines and Similar Apparatus, of which the following description, in connection with the accompanying drawings, is a specification, like letters on the drawings representing like parts.

The object of my invention is to utilize a portion of the heat that is now wasted in manufactories and similar places where steam-power is used. In such establishments where condensing-engines are used large quantities of water are heated to a high temperature—in the neighborhood of 125° Fahrenheit—in the operation of condensing the steam, and although small portions of the heated water are utilized for the feed-water for boilers and other purposes, the greater part of the water runs to waste, carrying with it the heat that has been imparted to it by the condensing steam.

The main object of my invention is to utilize a greater or less portion of this heat which is now wasted, which utilization is effected by causing a current of air to be exposed to the heat of the water discharged from the engine, and using the air thus heated for warming the apartments of the building, or for other purposes for which hot air can be used.

The invention is embodied in an apparatus for performing these operations, said apparatus comprising a condensing-engine and a heater in which a current of air is exposed directly or indirectly to the hot water discharged from the engine, and means for maintaining the air-current and for delivering the air after passing through the heater into the apartments to be warmed.

Figure 1:
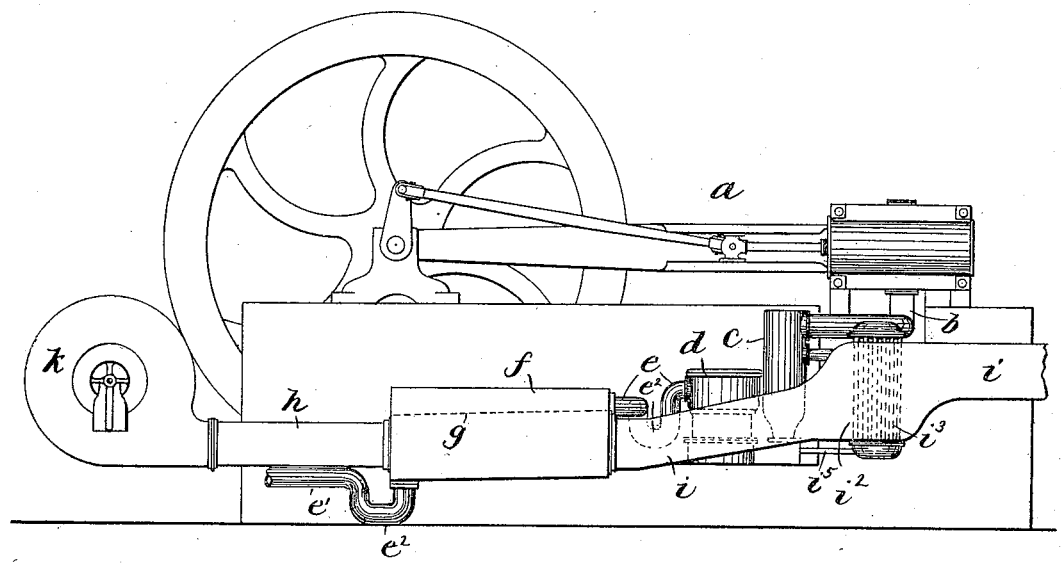
Figure 2:
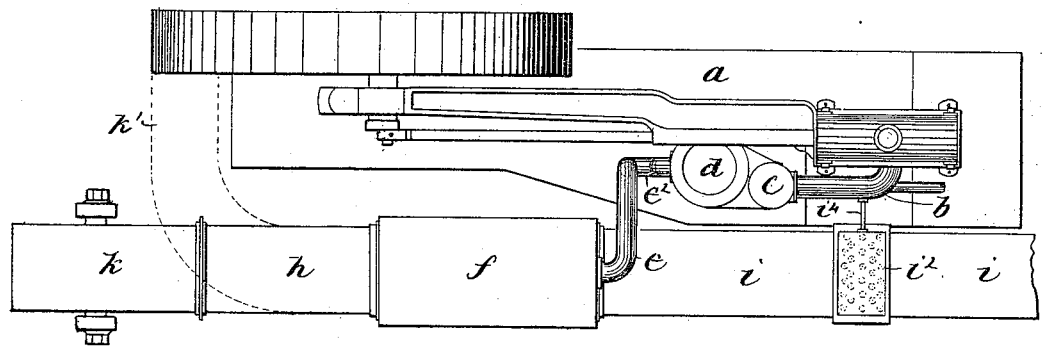

Figure 1 shows in side elevation a sufficient portion of an apparatus for utilizing waste heat to illustrate this invention; Fig. 2, a plan view of said apparatus. Figs. 3 to 6, inclusive, are sectional views illustrating different constructions of the heater in which the heat is taken from the water and imparted to the air-current; and Fig. 7, a vertical sectional view showing the condenser, air-pump, and heater, and their connecting-ducts in longitudinal section; Fig. 8, a side elevation of the apparatus, showing a modification of the means for producing the air-current; and Fig. 9, a sectional detail on line $z$ of Fig. 8.

The engine $a$, of any usual construction, exhausts the steam through the pipe $b$ into a condenser $c$. (Shown in this instance as an injection-condenser, although the invention is equally applicable to an engine having a surface-condenser.) In either case large quantities of water are heated to about 125° Fahrenheit (more or less) by the condensing steam, and usually the greater portion of the water thus heated is permitted to run to waste. When an injection-condenser is employed, the hot water is drawn from the condenser $c$ by the air-pump, (represented at $d$,) and the portion of the hot water, if there be any, that is utilized is commonly taken from the discharge-pipe $e$ of the air-pump.

In order to utilize the heat that has heretofore been carried off by the water delivered from the condenser, the said water is in accordance with this invention delivered from the pipe $e$ into a heater $f$, (shown in Fig. 1 as a chamber,) having a perforated partition $g$, upon which the heated water is delivered from the pipe $e$, so that it falls in drops or streams through the perforations of the plate $g$ and through the body of the chamber below the partition. The said chamber $f$ is provided at one end with an inlet pipe or conductor $h$ and at its other end with an outlet pipe or conductor $i$ for air, which, when caused to move through the said pipe, passes through the falling streams of heated water in the chamber $f$, and is heated thereby, and the air thus heated may be conveyed to any apartment in the mill or manufactory that needs to be warmed.

In many of the operations carried on in mills it is desirable to have the air moistened, and by having the cold air pass through or come directly in contact with the hot water, as just described, the air will, besides being heated, also take up a considerable amount of moisture, which will be beneficial.

While the water is delivered from the engine in large quantities, its temperature is not very high, and if it is desired to heat the air to a higher temperature than can be attained by its exposure to the hot water it may, after leaving the heater, be passed through an additional heating-chamber $i^2$, through which a number of small pipes $i^3$ pass, the said pipes $i^3$ communicating with the exhaust-pipe $b$ of the engine, as shown at $i^4$, Fig. 2, and also communicating with the condenser or inlet to the air-pump $d$, as shown at $i^5$, Fig. 1. Thus a small portion of the steam exhausted from the engine passes through the pipes $i^3$ on its way to the condenser, and the air delivered from the heater $f$ passes around and between the said pipes, and thus has its temperature raised.

In many places the current of air through the heater will be maintained naturally, as the hot air will be delivered at a point above the heater and the air will be rarefied and tend to rise when its temperature is raised. If necessary, however, the current of air may be maintained artificially by a forcing device, (represented in Figs. 1 and 2 as a fan-blower $k$, of usual construction,) or in some cases the blast or current of air produced by the fly-wheel and belt of the engine may be utilized by providing a suitable casing around the wheel, as shown at $k^{10}$, Figs. 8 and 9, and even providing the latter with wings or blades $k^{12}$, (see Figs. 8 and 9,) if need be.

The invention is not limited to any specific construction of the heater $f$.

Figure 3:
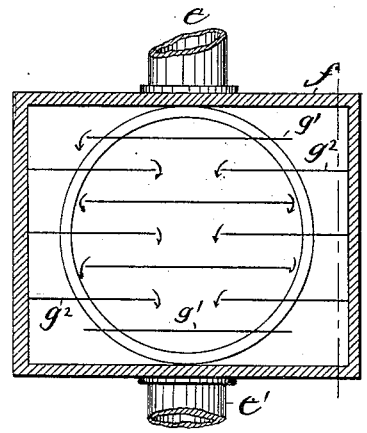
Figure 4:
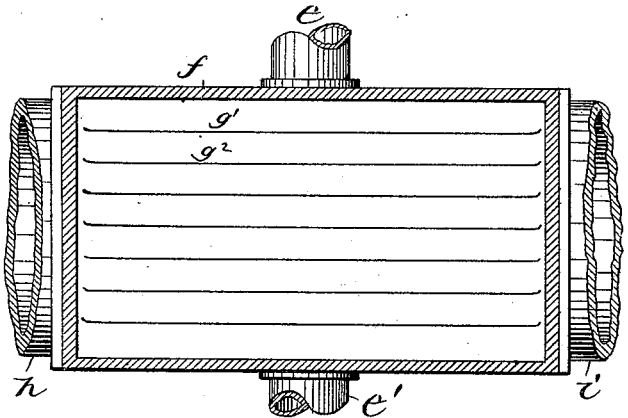

As shown in Figs. 3 and 4, the water enters the top of the chamber from the delivery-pipe $e$ of the air-pump and then flows down over a series of shelves or partitions $g'$ $g^2$ in the chamber $f$, a portion of said partitions extending across the middle of the chamber, but not reaching the side walls, while the other partitions $g^2$ meet the side walls of the chamber, but do not extend across the middle of the chamber, so that the water flows down through the chamber in a zigzag direction, as indicated by the arrows, and the air, which flows lengthwise of the chamber, is thoroughly exposed to the streams or sheets of water falling from the different partitions.

Figure 5:
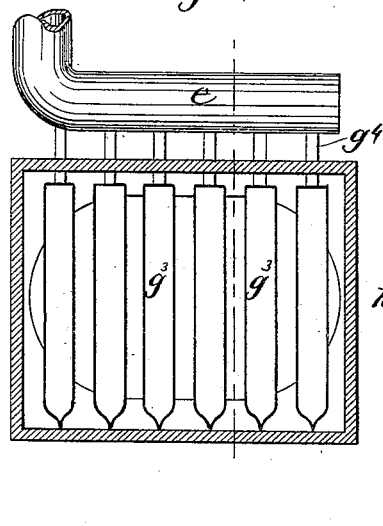
Figure 6:
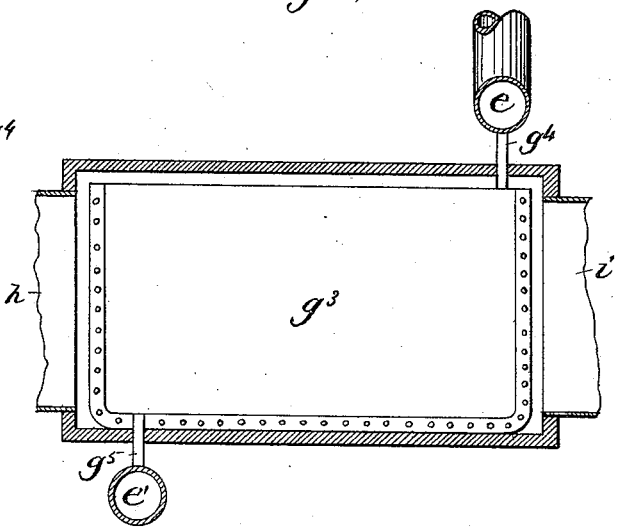

In the forms of heater represented in Figs. 1 to 4, in which the air is exposed directly to the water, the inlet-pipe $e$ and outlet-pipe $e'$ from the heating-chamber $f$ will preferably be trapped, as shown at $e^2$, so as to prevent the air from passing from the chamber $f$ into the said pipes. In case it is desirable not to have the air exposed directly to the water, a surface-heater may be employed, or one in which the air moves over the surface of chambers or passages through which the water flows. A heater of such construction is illustrated in Figs. 5 and 6, in which the chamber $f$, through which the current of air flows, as previously described, contains a number of flat chambers $g^3$, each communicating at one end by a pipe $g^4$ with the outlet-pipe $e$ from the condenser, and at the other end by a pipe $g^5$ with the waste or delivery pipe $e$. The hot water thus constantly enters at the upper part of the chamber $g^3$, and after passing wholly across the said chamber is delivered at the lower end of said chamber, and the air enters the outer chamber near the delivery ends of the hot-water chambers, and is delivered near the receiving ends of said chambers, having been thoroughly heated in its passage.

An apparatus of this kind may be used in steamships as well as factories, and when employed in connection with an engine having a surface-condenser the circulating water is used to impart heat to the air.

When the air is heated by direct contact with the water, as in the apparatus represented in Figs. 3 and 4, it should not generally be heated much above the temperature of the apartment to be warmed, as it will, when heated by direct contact with the water, become laden with moisture, which would be deposited if it were subsequently cooled any considerable amount.

The employment of the supplementary heater such as represented at $i^2$ will obviate the tendency of the air to deposit the moisture when its temperature is subsequently reduced.

Portions of the same apparatus may be used for ventilation when no heat is required. A conductor is represented in dotted lines at $k'$, Fig. 2, leading from the fly-wheel case to the air-pipes for the purpose of utilizing the disturbance of the air produced by the fly-wheel to maintain the proper current or circulation in the pipes.

I claim—

1. The combination of a steam-engine having a fly-wheel and condenser for exhaust-steam with a heater and a duct connecting the same with said condenser, and an air duct or passage leading from the fly-wheel to the said heater, as described, whereby the motion of the fly-wheel produces a current of air through the heater in which the said air is heated from the hot water conveyed to the heater from the condenser, substantially as described.

2. The combination of an engine having a condenser in which the exhaust-steam is condensed by water, which is thereby heated, with a heater and duct connecting the same with the condenser of the engine, and an air-duct communicating with the said heater by which air is conveyed through the said heater and heated by the hot water delivered thereto from the condenser, substantially as described.

In testimony whereof I have signed my name to this specification in the presence of two subscribing witnesses.

HENRY S. ROBINSON.

Witnesses:
   JOS. P. LIVERMORE,
   JAS. J. MALONEY.